United States Patent
Li

(10) Patent No.: US 9,207,463 B2
(45) Date of Patent: Dec. 8, 2015

(54) CONNECTION DEVICE FOR CONNECTING LENS TO FRAME

(71) Applicant: SUN SIGHT GLASSES CO., LTD., Tainan (TW)

(72) Inventor: Jui-Chi Li, Tainan (TW)

(73) Assignee: Sun Sight Glasses Co., Ltd., Tainan (TW)

( * ) Notice: Subject to any disclaimer, the term of this patent is extended or adjusted under 35 U.S.C. 154(b) by 0 days.

(21) Appl. No.: 14/210,657

(22) Filed: Mar. 14, 2014

(65) Prior Publication Data
US 2015/0261007 A1     Sep. 17, 2015

(51) Int. Cl.
*G02C 1/04*     (2006.01)
*G02C 1/00*     (2006.01)

(52) U.S. Cl.
CPC .. *G02C 1/04* (2013.01); *G02C 1/10* (2013.01); *G02C 2200/08* (2013.01)

(58) Field of Classification Search
CPC ............ G02C 1/00; G02C 1/02; G02C 1/023; G02C 1/10; G02C 2200/06; G02C 2200/08
USPC .................................. 351/103–109, 140, 154
See application file for complete search history.

(56) References Cited

U.S. PATENT DOCUMENTS 7,219,993 B1 *   5/2007   Chiou ........................... 351/103
7,481,529 B1 *   1/2009   Chen ............................... 351/86

* cited by examiner

*Primary Examiner* — Huy K Mai
(74) *Attorney, Agent, or Firm* — Rosenberg, Klein & Lee

(57) ABSTRACT

A connection device for connecting a lens unit to a frame and includes a connection member which has a protrusion, and the protrusion is engaged with the frame and a notch of the lens unit so as to connect the lens unit and the frame. The connection member allows the user to easily separate the frame from the notch of the lens unit so as to quickly replace a new lens unit.

2 Claims, 5 Drawing Sheets

CONNECTION DEVICE FOR CONNECTING LENS TO FRAME

BACKGROUND OF THE INVENTION

1. Fields of the Invention

The present invention relates to a connection device, and more particularly, to a connection device for easily connecting lenses to a frame, and removing lenses from the frame.

2. Descriptions of Related Art

The conventional glasses generally comprise a frame and two lenses engaged with two lens rims, and two temples are pivotably connected to the frame so as to be worn to the user's ears. The lenses are forced to be fitted with the grooves defined in the insides of the lens rims, and this is not easy and takes a lot of time. The lenses can be broken if the installation is not properly. Therefore, some manufacturers develop lenses and/or parts replaceable glasses, such that the glasses may have different appearances and more attractive.

The present invention intends to provide a pair of glasses with a simple connection device which allows the users to easily replace lenses.

SUMMARY OF THE INVENTION

The present invention relates to a connection device and comprises a frame having at least one reception slot defined therein. The at least one reception slot has an engaging slot. Two pivot recesses are defined in two insides of the at least one reception slot. A lens unit has a notch defined in the top edge thereof and the notch is located corresponding to the engaging slot. A connection member is engaged with the reception slot and has two pivots extending from two sides thereof. The two pivots are pivotably engaged with the two pivot recesses of the frame. The connection member has a protrusion which is located corresponding to the engaging slot of the lens unit. The protrusion is engaged with the frame and the notch of the lens unit to combine the lens unit with the frame.

Preferably, the notch of the lens unit, the engaging slot of the reception slot and the protrusion of the connection member are dove-tailed.

Preferably, the connection member has an inclined face which faces the frame so that a user pushes the inclined face to remove the protrusion from the notch of the lens unit and the frame.

The primary object of the present invention is to provide a simple connection device to easily connect a lens unit to a frame, or to easily remove a lens unit from a frame.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
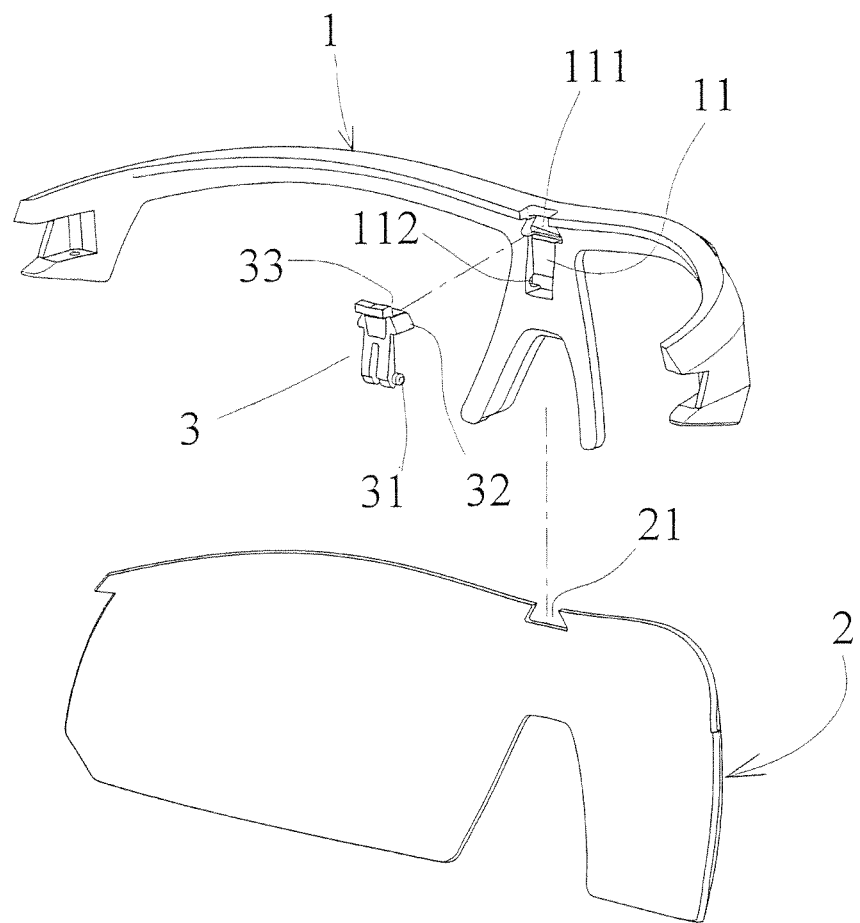
FIG. 1 is an exploded view to show the connection device of the glasses of present invention.

Referring to FIG. 1, the connection device of the glasses of the present invention comprises a frame 1 having at least one reception slot 11 defined therein which has an engaging slot 111. Two pivot recesses 112 are defined in two insides of the at least one reception slot 11.

A lens unit 2 has a notch 21 defined in the top edge thereof and the notch 21 is located corresponding to the engaging slot 111.

A connection member 3 is engaged with the reception slot 11 and has two pivots 31 extending from two sides thereof. The two pivots 31 are pivotably engaged with the two pivot recesses 112 of the frame 1. The connection member 3 has a protrusion 32 which is located corresponding to the engaging slot 111 of the lens unit 2.

Figure 2:
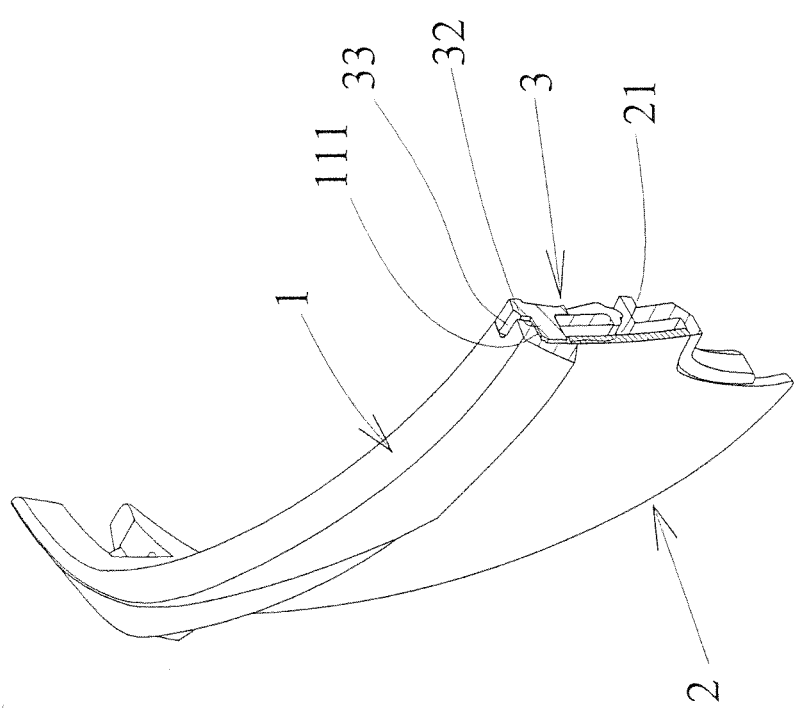
FIG. 2 is a cross sectional view, partly removed, of the connection device of the glasses of the present invention.
Figure 3:
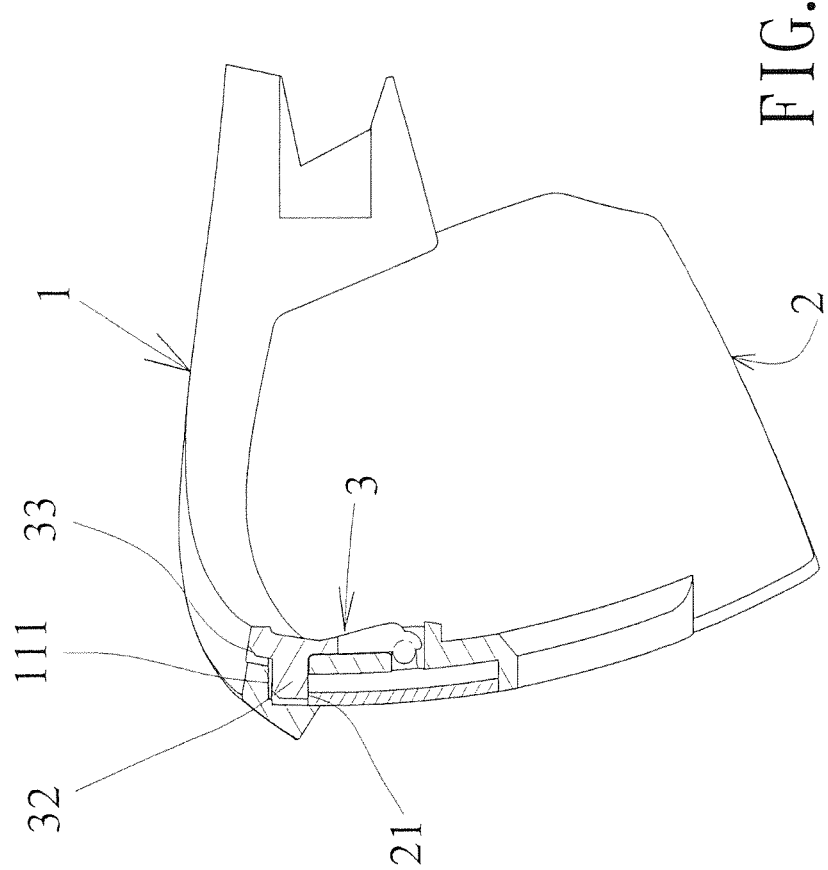
FIG. 3 is another cross sectional view, partly removed, of the connection device of the glasses of the present invention.
Figure 4:
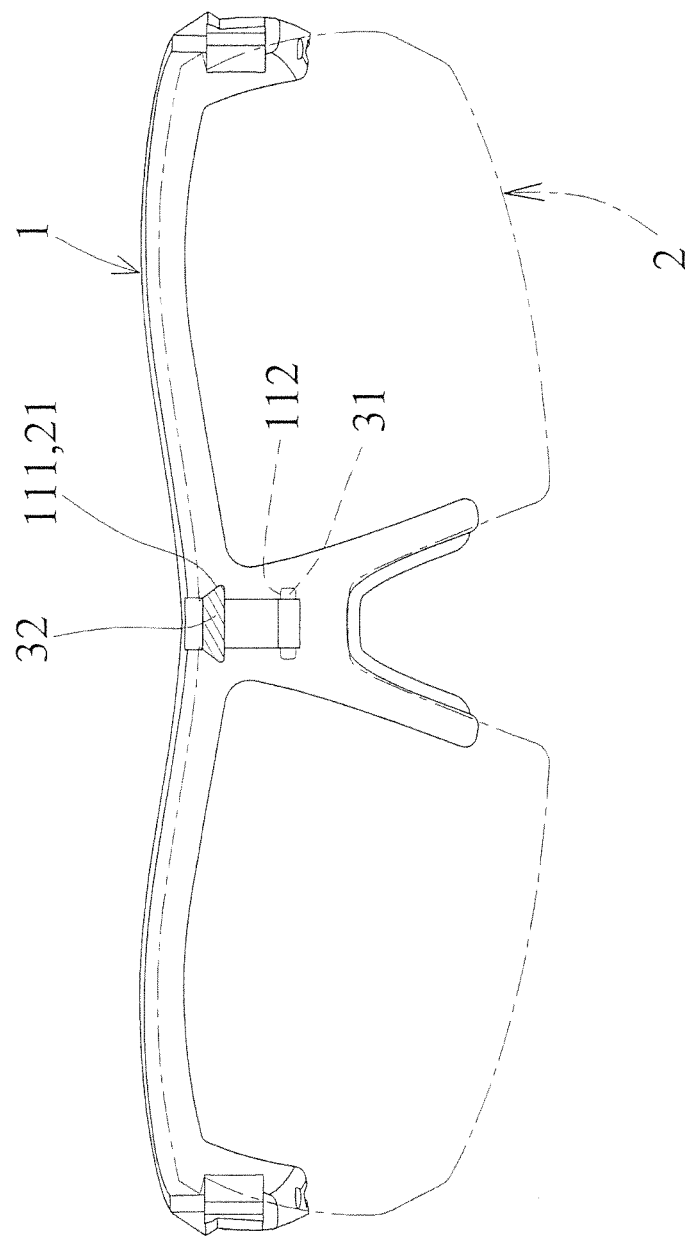
FIG. 4 is a front view of the connection device of the glasses of the present invention.
Figure 5:
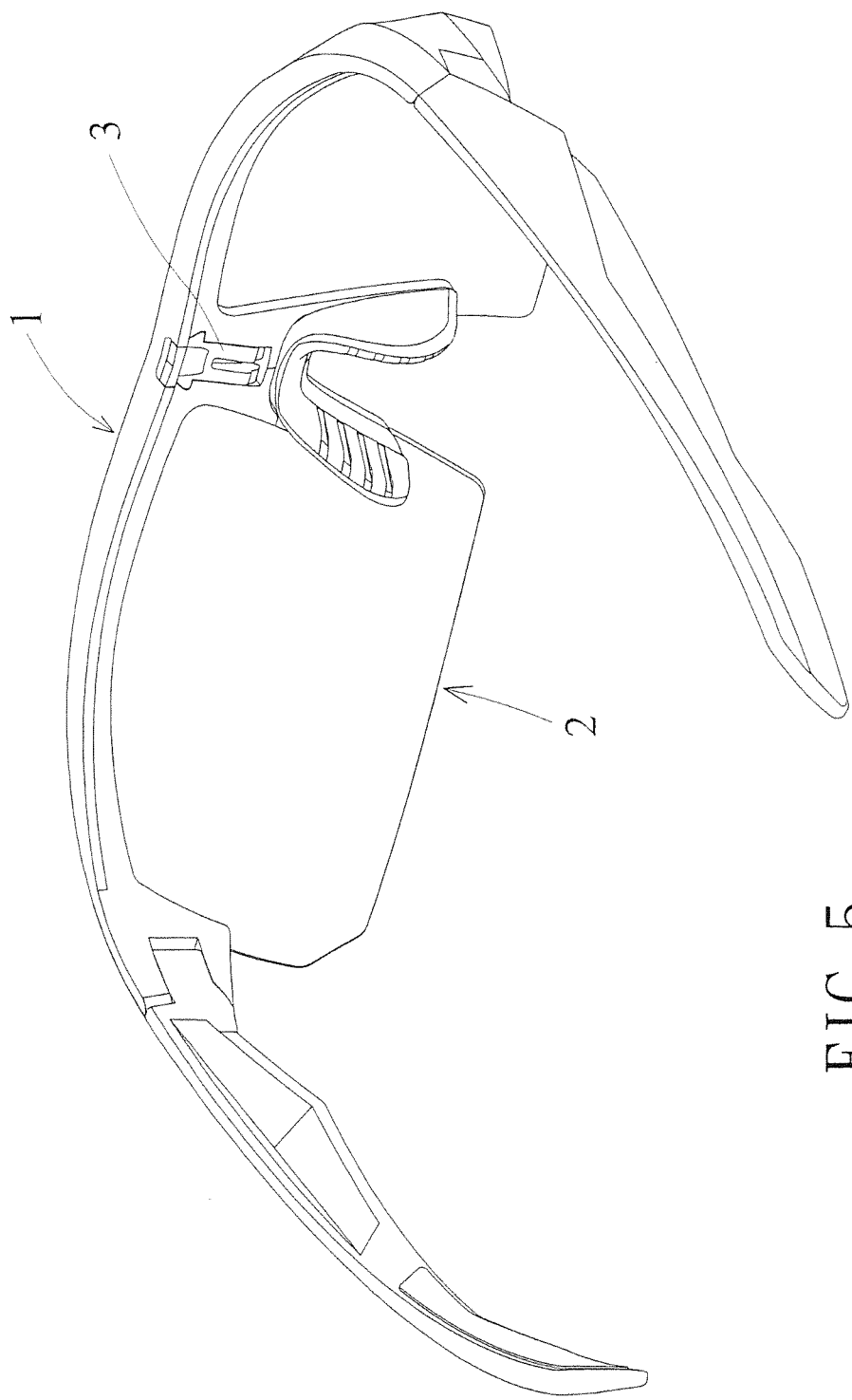
FIG. 5 is a perspective view to show the connection device of the glasses of the present invention.

As shown in FIGS. 2 to 4, the notch 21 of the lens unit 2, the engaging slot 111 of the reception slot 11 and the protrusion 32 of the connection member 3 are dove-tailed, so that the protrusion 32 is engaged with the frame 1 and the notch 21 of the lens unit 2 to combine the lens unit 2 with the frame 1 as shown in FIG. 5. The connection member 3 has an inclined face 33 which faces the frame 1 so that a user can directly pushes the inclined face 33 to remove the protrusion 32 from the notch 21 of the lens unit 2 and the engaging slot 111 of the frame 1.

The present invention can easily replace or change a different lens unit 2 by simply operating the connection member 3. It is noted that the connection member 3 is connected with the frame 1, so that the connection member 3 does not lost during replacement of the lens unit 2.

While we have shown and described the embodiment in accordance with the present invention, it should be clear to those skilled in the art that further embodiments may be made without departing from the scope of the present invention.

What is claimed is:

1. A connection device comprising:
a frame having at least one reception slot defined therein, the at least one reception slot having a dovetail-shaped engaging slot and two pivot recesses defined in two inner sides of the at least one reception slot;
a lens unit having a dovetail-shaped notch defined in a top edge thereof and the dovetail-shaped notch being located in correspondence with the engaging slot, and
a connection member having two pivots extending from two sides thereof respectively engaged with the two pivot recesses for pivotally coupling the connection member to the frame, the connection member having a dovetail-shaped protrusion extending therefrom, the connection member being rotatable to engage the dovetail-shaped protrusion with the dovetail-shaped engaging slot through the dovetail-shaped notch to combine the lens unit with the frame.

2. The connection device as claimed in claim 1, wherein the connection member has an inclined face which faces the frame, the inclined face being pushed by a user to remove the protrusion from the notch of the lens unit and the frame.

* * * * *